July 25, 1944.    C. B. SPASE    2,354,621
CLUTCH
Filed June 2, 1942    2 Sheets-Sheet 1

INVENTOR.
Charles B. Spase
BY Bodell & Thompson
ATTORNEYS.

July 25, 1944. C. B. SPASE 2,354,621
CLUTCH
Filed June 2, 1942 2 Sheets-Sheet 2

INVENTOR.
Charles B. Spase.
BY Bodell & Thompson.
ATTORNEYS.

Patented July 25, 1944

2,354,621

UNITED STATES PATENT OFFICE 2,354,621

CLUTCH

Charles B. Spase, Nedrow, N. Y., assignor to Lipe-Rollway Corporation, Syracuse, N. Y., a corporation of New York Application June 2, 1942, Serial No. 445,459

1 Claim. (Cl. 192—98)

This invention relates to friction clutches of the type used in motor vehicles and including a throw-out sleeve and motion transmitting levers between the sleeve and the member of the clutch, which is shiftable axially to engage and disengage the clutch, and has for its object a particularly simple means for holding the bearings of the throw-out yoke out of engagement with the throw-out sleeve, when the clutch is engaged so that said bearings are idle and not constantly rotating.

It further has for its object a particular arrangement of the inner ends of the clutch levers and the throw-out sleeve by which these parts are readily assembled, and this assembly combined with the means for holding the bearings of the throw-out yoke out of engagement with the throw-out sleeve when the clutch is engaged.

The invention consists in the novel features and in the combinations and constructions hereinafter set forth and claimed.

In describing this invention, reference is had to the accompanying drawings in which like characters designate corresponding parts in all the views.

Figure 1:
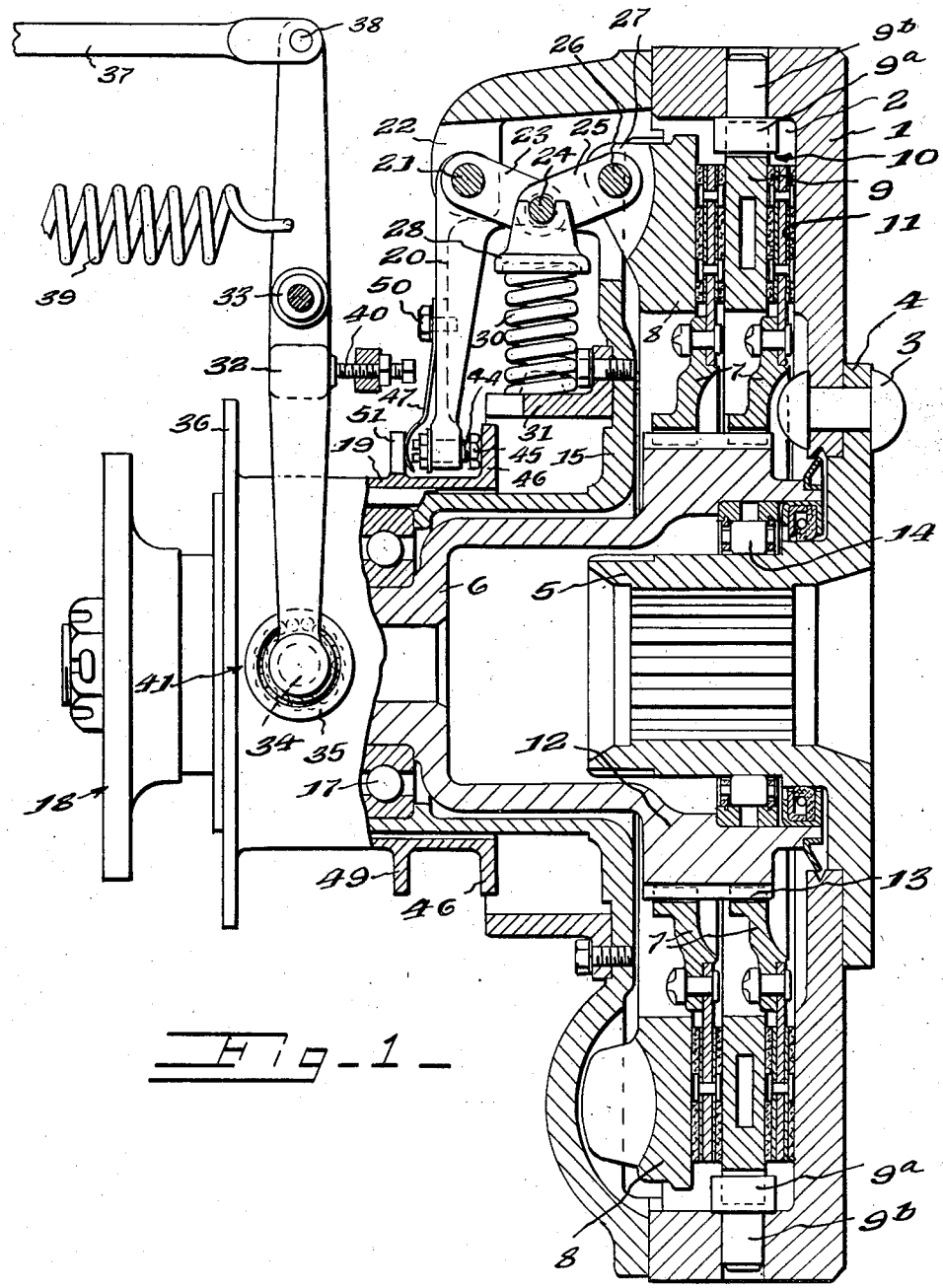
Figure 1 is a longitudinal sectional view of one form of clutch embodying this invention.

The construction of the clutch itself forms no part of this invention, and it may be of any suitable form, size and construction. The clutch itself constitutes the subject matter of my Patent Number 2,280,357 issued April 21, 1942.

In the clutch here illustrated, I designates the driving element, this constituting the fly wheel of the engine and being formed with a cylindrical recess 2 in its rear side, the driving element being secured, as by rivets 3, to a flange 4 on an applicator hub 5 extending axially into the recess 2. This hub is for mounting on the end of the crank shaft of the engine to which the clutch is applied. The driven element of the clutch includes a clutch shaft 6 and one or more friction disks or plates 7 slidably mounted thereon in the recess 2. As here shown, the clutch is formed with two plates or friction disks 7.

8 designates the pressure ring coacting with the outermost plate or disk 7. 9 is a second pressure ring rotatable with the driving element 1 and slidably interlocked at its periphery at 10 with the annular wall of the driving element 1, as by lugs 9ª, having stems 9ᵇ extending into holes in the cylindrical wall of the recess, these being interleaved with friction disks 7. The innermost friction disk 7 thrusts against the pressure face 11 at the bottom of the recess 2. The clutch shaft has a hollow hub or head portion 12, which encloses the hub 5. The disks 7 are slidably splined at 13 on the hub 12. The hollow hub or head portion 12 has a bearing 14 on the periphery of the driving hub 5.

15 designates the back plate or cover for the recess 2 of the driving element, this being discoidal and secured to the rim of the cylindrical wall of the driving member and having a hub in which the clutch shaft 6 is journalled, an antifriction bearing 17 interposed between the hub and the rear portion of the hub 12. The bearing 17 is spaced axially from the hub 12. 18 is a coupling for the propeller shaft, this being mounted on the rear end of the clutch shaft 6 and secured thereto in any suitable manner.

The clutch operating or throw-out mechanism includes a throw-out sleeve 19 slidable on the hub 12 and motion transmitting means between it and the pressure ring 8, the motion transmitting means here illustrated including a series of radially extending levers 20 pivoted at 21 at their outer ends to bosses or stems 22 projecting from the rim of the back plate 15 on the outer side thereof. Each of these levers has an angular arm 23 forming one link of a toggle, which is pivoted at 24 to the other toggle link 25, the link 25 being pivoted at 26 to lugs 27 on the rear or outer side of the pressure ring 8 and extending through suitable openings in the back plate 15. The links of the toggle are normally arranged folded radially inward from a line parallel to the axis of the clutch and passing through the pivots 21, 26 and straighten toward said line. The toggles straighten under the influence of the clutch springs acting radially on the joint of the toggle. Mounted on the joint of each toggle is a spring seat 28. One or more clutch springs 30 are interposed between each spring seat 28 and an additional spring seat 31 carried by the back plate 15 and located between the joint of the toggle and the hub 12. As here shown, this is acted upon by a pair of springs 30 which tend to straighten the toggle and engage the clutch. The clutch here illustrated is of the pull type, that is, it is disengaged by pulling the throw-out sleeve outward. The clutch thus far described is substantially the same as that described in the patent referred to.

The means for operating the throw-out sleeve 19 to disengage the clutch comprises a yoke lever 32 having a hub 33 pivotally mounted on any suitable part of the machine or vehicle in which the clutch is installed, the arms of the yoke having inwardly extending trunnions at 34 on each of which is mounted an antifriction roller 35, these rollers thrusting against a peripheral shoulder, as an annular flange 36 on the rear end of the throw-out collar 19. The throw-out yoke lever 32 may be operated from a suitable lever, as a clutch pedal, it being connected to the clutch pedal by a link 37 pivoted at 38 to the lever 32 above the hub or pivotal point 33. Means are provided for biasing the yoke lever 32 to normally hold the rollers 35 away from the flange 36 when the clutch is engaged under the influence of the clutch springs 30, and thus holding the rollers 35 from rotating when the clutch is engaged. This means consists of a suitable spring as 39 connected to the yoke operating mechanism to actuate the yoke in a retrograde direction after the clutch pedal or link 37 has been released, and returned to starting position, this actuation by the spring 39 shifting the rollers 35 away at 41 from the shoulder or flange 36, when the clutch is fully engaged. An adjustable stop screw 40 limits the actuation of the yoke lever 32 by the spring 39 to prevent the rollers from engaging any other part of the throw-out sleeve, when the clutch is engaged, as the abutment 49 to be described.

Figure 2:
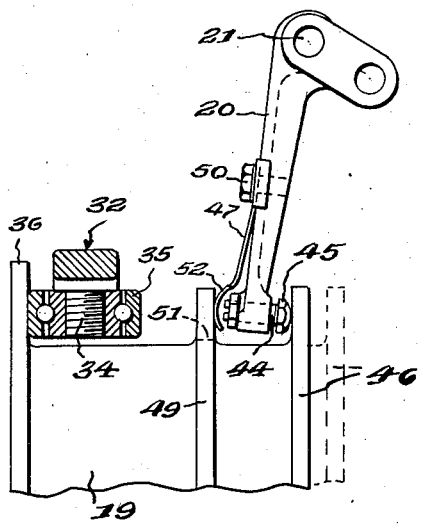
Figures 2 and 3 are fragmentary detail views taken at a right angle to each other of the clutch levers and the throw-out sleeve, one of the bearings of the throw-out yoke being shown in Figure 2.
Figure 3:
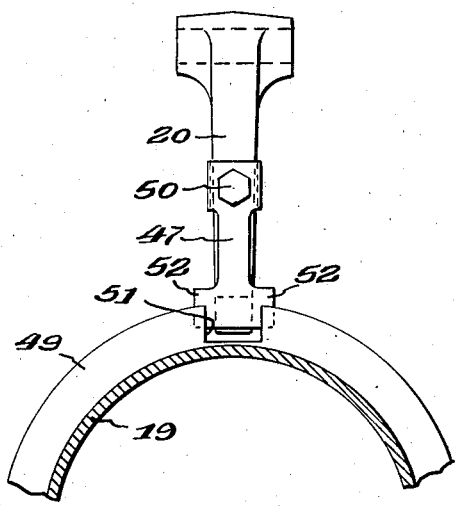
Figure 4:
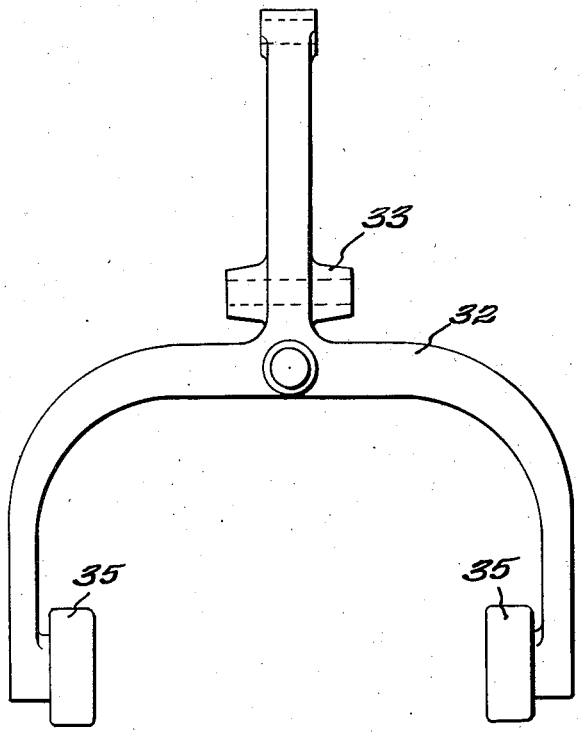
Figures 4 and 5 are respectively front and side elevations of the throw-out yoke.
Figure 5:
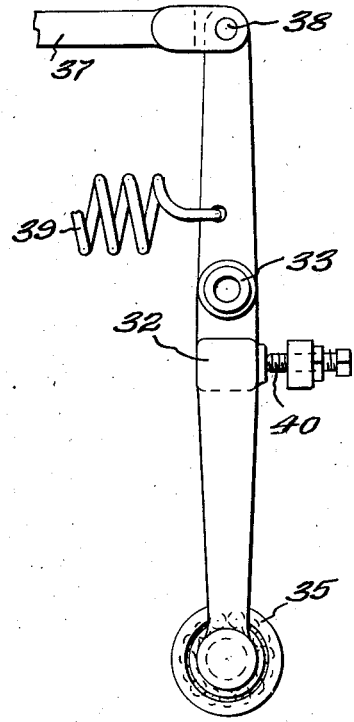

The clutch wear at the friction faces is automatically taken up by the clutch springs continually tending to straighten the toggle as far as possible toward a straight line and the space at 41 is sufficient to permit such automatic take up without the flange 36 engaging the rollers 35. When this space or clearance 41 is taken up, an adjustment of the screw 40 is required. To adjust to take up wear, the initial angles of the radial levers 20 are changed to fold the toggle links 23 and 25 further inwardly, and this adjustment is effected by means of screws 44, one at the inner end of each lever 20 and extending transversely therethrough in a direction lengthwise of the axis of the clutch, the screws having heads 45 thrusting against a peripheral shoulder or annular flange 46 on the inner end of the throw-out sleeve 19, that is, the end opposite to that at which the flange 36 is located. In order to prevent the throw-out sleeve 19 from shifting idly, as to the right in Figure 2, and thus bringing the flange or shoulder 36 up against the rollers 35, when the clutch is engaged, means is provided for holding the sleeve 19 from shifting and taking up the space 41. As here shown, this means consists of a spring 47 interposed between each lever 20 and an abutment or annular flange 49 on the throw-out sleeve 19 in the rear of the shoulder 46. The spring 47 is here shown as a leaf spring fixed to each lever between the ends thereof, as at 50, and extending along the lever and thrusting at its inner end against the abutment 49. The springs are biased to thrust the sleeve 19 rearwardly or to the left and hold it from shifting forward away from the heads 45 of the adjusting screws 44 when the clutch is engaged and thus maintaining the clearance at 41. This peripheral shoulder or abutment 49 is formed with notches 51 (Figure 3) which are primarily for the purpose of assembling the inner ends of the levers in the groove formed between the flanges 46 and 49, which groove is of greater width than the combined widths of the inner ends of the levers 20, the adjusting screw 44 and the springs 47. The springs 47 are provided with widened portions 52 which bridge these notches 51 and bear on the flange on opposite sides of the notches.

In operation, when the clutch is engaged, a spring 39 moves the yoke lever 32 up against the stop screw 40, this being adjusted to form the clearance at 41 of predetermined width between the flange 36 on the throw-out sleeve 19 and the rollers 35, so that the spring 39 acting on the yoke lever 32 holds the rollers 35 off the flange 36, and hence the rollers 35 do not rotate when the throw-out sleeve 19 is engaged. The springs 47 on the clutch levers 20 hold the sleeve from shifting idly forward when the clutch is engaged, and hence hold the sleeve or the shoulder 36 away from the rollers 35. When the clutch is fully engaged, the levers 20 can not follow up the throw-out sleeve 19 to the right, because they are held from doing so by reason of the full engagement of the friction faces of the clutch. When the friction faces of the clutch wear to such an extent that the throw-out collar 19 shifts, under the influence of the clutch springs 30 through the clutch levers 20, and the clearance 41 is taken up, then the screws 44 are adjusted to again establish the clearance at 41 and the adjusting screw 40 adjusted to again stop the shifting-in movement of the yoke lever 32 into such position that the clearance 41 is again established.

What I claim is:

In a friction clutch including driving and driven elements, one of which includes an axially shiftable member to engage and disengage the clutch, spring means tending to engage the clutch, and throw-out mechanism including an axially shiftable sleeve rotatable with one of said elements, and levers for transmitting the motion thereof to the shiftable member, the throw-out sleeve being formed with a peripheral shoulder against which like ends of the levers thrust when the clutch is engaged and during the throwing out operation, an annular abutment on the sleeve and opposed to and spaced from said shoulder, the inner ends of the levers being spaced from the abutment, said abutment having notches therein; the combination of springs interposed between the levers and the abutment and bridging the notches and operating to prevent shifting of the sleeve to carry the shoulder away from the inner ends of the levers, and a throw-out yoke having bearings coacting with the sleeve.

CHARLES B. SPASE.